United States Patent [19]

Mori et al.

[11] Patent Number: 5,204,077
[45] Date of Patent: Apr. 20, 1993

[54] POLLUCITE CRYSTALLINE POWDERS WITH LOW THERMAL EXPANSION COEFFICIENTS AND METHODS FOR THEIR PREPARATION

[75] Inventors: Toshiyuki Mori, Tsuchiura; Hiroshi Yamamura, Tsukuba; Takashi Mitamura, Urawa; Hidehiko Kobayashi, Saitama, all of Japan

[73] Assignee: Tosoh Corporation, Yamaguchi, Japan

[21] Appl. No.: 760,136

[22] Filed: Sep. 16, 1991

[30] Foreign Application Priority Data

Dec. 19, 1990 [JP] Japan .................................. 2-411713
Aug. 9, 1991 [JP] Japan .................................. 3-223561

[51] Int. Cl.$^5$ ...................... C01B 33/34; C01B 33/32; C01F 7/00
[52] U.S. Cl. .................... 423/328.2; 423/332; 423/593
[58] Field of Search ................... 423/328, 332, 593

[56] References Cited

U.S. PATENT DOCUMENTS 3,723,140  3/1973  Beall et al. ........................ 501/66

OTHER PUBLICATIONS

Gallagher, S. A., et al., "Preparation and X-Ray Characterization of Pollucite ($CsAlSi_2O_6$)", J. Inorg. Nucl. Chem. vol. 43, 1981, pp. 1773-1777.
Richerson, D. W. et al., "Synthesis and Thermal Expansion of Polycrystalline Cesium Minerals", J. of The Amer. Cer. Soc.-Disc. and Notes, May, 1972, pp. 269-273.
Kobayashi, et al., "Preparation and Thermal Expansion Behavior of Pollucite Powders by Sol-Gel Processing", Nippon Seramikkusu Kyokai Gakujutsu Rombunshi, 99(8), Aug. 1991, pp. 686-691.
"The Thermal Expansion Of The Leucite Group Of Minerals"—The American Mineralogist, vol. 53, 1968 pp. 1976-1988.

Primary Examiner—Michael Lewis
Assistant Examiner—Steven Bos
Attorney, Agent, or Firm—Nixon & Vanderhye

[57] ABSTRACT

A pollucite powder consisting essentially of a pollucite phase and having an $Al_2O_3/SiO_2$ molar ratio of from 0.21 to 0.25 and a $Cs_2O/SiO_2$ molar ratio of from 0.19 to 0.22.

1 Claim, 3 Drawing Sheets

POLLUCITE CRYSTALLINE POWDERS WITH LOW THERMAL EXPANSION COEFFICIENTS AND METHODS FOR THEIR PREPARATION

The present invention relates to pollucite powders suitable for the production of pollucite sintered bodies having low thermal expansion coefficients which are useful as e.g. highly heat resistant materials, carriers for catalysts or substrate materials, and methods for their preparation.

Conventional pollucite is represented by the formula $Cs_2O.Al_2O_3.4SiO_2$ and thus has a composition having an $Al_2O_3/SiO_2$ molar ratio of 0.25 and a $Cs_2O/SiO_2$ molar ration of 0.25. In this specification, "pollucite" means the one having the same cubic phase crystal structure as the conventional pollucite, having the following X-ray diffraction pattern as measured at room temperature by means of a copper tubular bulb with a wavelength of 1.5418 Å and being represented by the formula $mCs_2O.nAl_2O_3.SiO_2$ or $mCs_2O.pLi_2O.nAl_2O_3.SiO_2$ wherein each of m, n and p is a number.

| d value (Å) | Relative intensity | hkl |
| --- | --- | --- |
| 3.629–3.675 | At least 20 and less than 60 | 321 |
| 3.395–3.438 | 100 | 400 |
| 2.895–2.931 | At least 20 and less than 60 | 332 |
| 2.663–2.697 | Less than 20 | 431 |
| 2.401–2.431 | At least 20 and less than 60 | 440 |
| 2.203–2.231 | Less than 20 | 611 |
| 1.960–1.985 | Less than 20 | 444 |
| 1.848–1.871 | Less than 20 | 721 |

The conventional pollucite powder is known to show substantial thermal expansion up to about 200° C., but show very low thermal expansion from 200° C. to about 1,000° C. As a method for obtaining such conventional pollucite powder, the following method has been proposed. Namely, highly pure aluminum is dissolved in nitric acid; then, tetraethyl orthosilicate and cesium carbonate are added thereto; and the mixture is calcined at a temperature of from 1,100° to 1,200° C. for from 3 to 6 days to obtain a conventional pollucite single phase powder (THE AMERICAN MINERALOGIST, Vol. 53, 1968 p. 1476 et seq).

By this method, it is possible to prepare a conventional pollucite single phase powder, but the obtained powder shows substantial thermal expansion in a relatively low temperature range as mentioned above and as is evident from FIG. 3 wherein data of the temperature dependency of the lattice constant as measured by the present inventors are plotted. Such powder is not necessarily adequately satisfactory as a starting powder for a low thermal expansion material. Therefore, it is an object of the present invention to provide a pollucite single phase powder having low thermal expansion within a range of from room temperature to 1,000° C. or to a higher temperature without no substantial thermal expansion which appears in a low temperature range with the conventional pollucite powder, and a method for its preparation.

The present inventors have found that the crystal phase of pollucite can be maintained even if the $Al_2O_3/SiO_2$ molar ratio and the $Cs_2O/SiO_2$ molar ratio are varied, that when such molar ratios are lowered beyond 0.25, the thermal expansion tends to hardly occur even at a low temperature range, and that by substituting part of cesium oxide by lithium oxide, the low thermal expansion property can be maintained up to a high temperature. Further, when a pollucite powder is prepared by calcination, it is usual that the cesium content tends to readily volatilize, and the aluminum content tends to volatilize together with the cesium content. The present inventors have studied also the conditions for calcination to control such volatility of the cesium content, etc. The present invention has been accomplished on the basis of these discoveries.

Thus, the present invention provides:

① A pollucite powder consisting essentially of a pollucite crystal structure and having an $Al_2O_3/SiO_2$ molar ratio of from 0.21 to 0.25 and a $Cs_2O/SiO_2$ molar ratio of from 0.19 to 0.22, i.e. a pollucite powder having a composition represented by the formula $a Cs_2O.bAl_2O_3.SiO_2$ wherein a is from 0.19 to 0.22, and b is from 0.21 to 0.25 and consisting essentially of a pollucite crystal structure;

② A pollucite powder consisting essentially of a pollucite crystal structure and having an $Al_2O_3/SiO_2$ molar ratio of from 0.21 to 0.25, a $(Cs_2O+Li_2O)/SiO_2$ molar ratio of from 0.19 to 0.22 and a $Li_2O/Cs_2O$ molar ratio of from 2/98 to 10/90, i.e. a pollucite powder having a composition represented by the formula $ac Li_2O.a(1-c)Cs_2O.bAl_2O_3.SiO_2$ wherein c is from 0.02 to 0.10, and consisting essentially of a pollucite crystal structure;

③ A method for preparing a pollucite powder, which comprises calcining a dehydrated mixture of alumina sol, silica sol and a cesium salt, having an $Al_2O_3/SiO_2$ molar ratio of from 0.214 to 0.25 and a $Cs_2O/SiO_2$ molar ratio of from 0.197 to 0.22, at a temperature of from 900° to 1,100° C. for from 5 to 20 hours;

④ A method for preparing a pollucite powder, which comprises calcining a dehydrated mixture of alumina sol, silica sol, a cesium salt and a lithium salt, having an $Al_2O_3/SiO_2$ molar ratio of from 0.214 to 0.25, a $(Cs_2O+Li_2O)/SiO_2$ molar ratio of 0.197 to 0.22 and a $Li_2O/Cs_2O$ molar ratio of from 2/98 to 10/90, at a temperature of from 900° to 1,100° C. for from 5 to 20 hours; and ⑤ A method for preparing a pollucite powder, which comprises calcining the dehydrated mixture in ③ or ④ at a temperature of from 600° to 800° C. for from 24 to 200 hours and then at a temperature of from 900° to 1,100° C. for from 20 to 100 hours.

Figure 1:
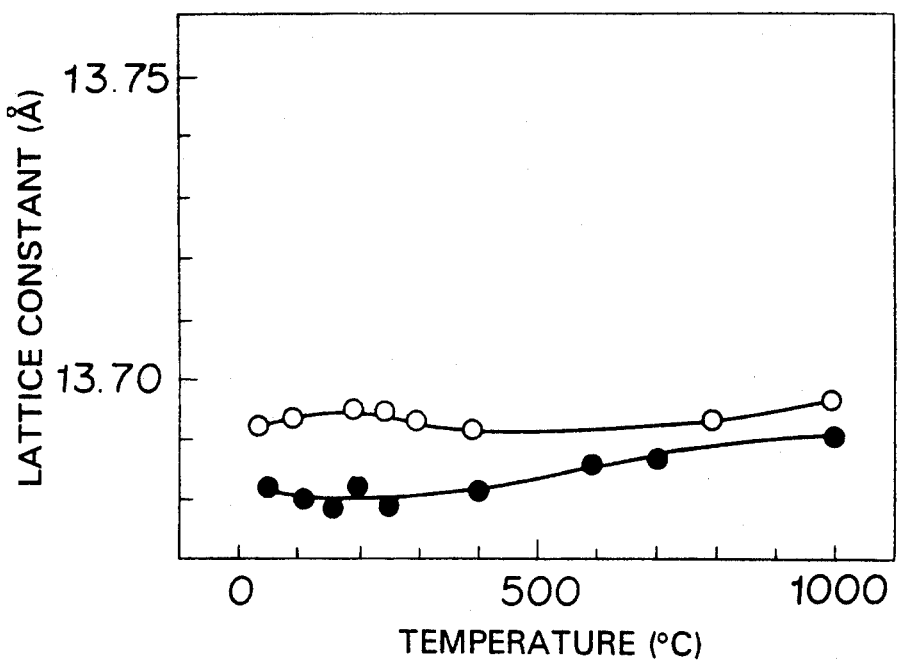
FIG. 1 is a graph showing the relation between the lattice constant of pollucite and the temperature, with respect to the pollucite obtained in Example 1 (shown by ○) and the one obtained in Example 2 (shown by ●).

Now, the present invention will be described in detail with reference to the preferred embodiments.

With the pollucite powder of ①, the low thermal expansion property is maintained within a range of from room temperature to 1,000° C. or up to a higher temperature depending upon the method for its preparation. For this purpose, the $Al_2O_3/SiO_2$ molar ratio must be within a range of from 0.21 to 0.25. If the molar ratio is less than this range, the powder tends to vitrify after the preparation and coagulate. Such powder is inferior in the low thermal expansion property not only within a low temperature range but also within a high temperature range. On the other hand, if the molar ratio exceeds the above range, the powder tends to show high thermal expansion within a relatively low temperature range such as from room temperature to 200° C. On the other hand, the $Cs_2O/SiO_2$ molar ratio must be within a range of from 0.19 to 0.22. If it is lower than this range, the powder tends to coagulate as in the above case where the $Al_2O_3/SiO_2$ molar ratio is too low, and the low thermal expansion property tends to be poor not only within a low temperature range but also within a high temperature range. On the other hand, if it exceeds the above range, the thermal expansion within a range of from room temperature to 200° C. tends to be substantial.

With the pollucite powder of ② having cesium oxide in the above pollucite composition substituted by lithium oxide in a proportion of from 2 to 10 mol %, the low thermal expansion property is maintained within a range of from room temperature to a temperature exceeding 1,000° C. irrespective of the method of its preparation. If the proportion for substitution is less than 2 mol %, the effects for lowering the thermal expansion in a temperature range exceeding 1,000° C. tend to be inadequate depending upon the conditions for its preparation. On the other hand, if it exceeds 10 mol %, it tends to be difficult to obtain a uniform solid solution, and a compound of lithium, aluminum and silicon (β-spodumene) tends to be present in the obtained conventional pollucite, whereby the low thermal expansion property of the powder tends to deteriorate, such being undesirable.

Now, the methods of ③ and ④ will be described. In the present invention, as the alumina source in the starting material, alumina sol is employed; as the silica source, silica sol is employed; as the cesium oxide source, a cesium salt such as cesium nitrate, cesium carbonate, cesium chloride or cesium sulfate, is employed; and as the lithium source, lithium nitrate, lithium carbonate, lithium chloride or lithium sulfate, is employed. The pollucite powder of ① or ② is obtained by calcining a dehydrated mixture of these materials. There is no particular restriction as to the method for the preparation of the dehydrated mixture. For example, a dehydrated mixture may be prepared by a method wherein alumina sol and silica sol are mixed and then subjected to dehydration treatment by an evaporator or a spray dryer, and then the cesium oxide source, or a cesium salt and a lithium salt, are added thereto and mixed by e.g. a ball mill; or a method wherein alumina sol, silica sol and an aqueous cesium salt solution, or such materials plus an aqueous lithium salt solution, are mixed, and the mixture is subjected to dehydration treatment, followed by mixing by e.g. a ball mill.

The conditions of ③ and ④ are intended to reduce the amount of volatilization of the cesium content and the aluminum content, or such contents plus the lithium content and to bring the composition of the powder product within a range of ① or ②. Further, the conditions of ③ are intended to obtain a powder product having a low thermal expansion coefficient within a range of from room temperature to at least 1,000° C., and the conditions of ④ are intended to obtain a powder product having a low thermal expansion coefficient within a range of from room temperature to a temperature exceeding 1,000° C. irrespective of using or not using a lithium salt as a starting material. Namely, the lithium content, the cesium content and the aluminum content are more readily volatile than the silicon content. Nevertheless, so long as the composition of the starting materials, the temperature for calcination and the time for calcination are controlled within the respective ranges as specified in ③ or ④, it is possible to obtain a pollucite powder having a composition within the range of ① or ②. Even when the ratios of the respective starting materials other than the silicon source, to the silicon source, are slightly deviated from the ranges specified in ③ or ④, the composition of the powder product may sometimes become within the range of ① or ②, but there is a possibility that the composition will be outside the specified range.

In a case where calcination is conducted in one step as in ③ or ④, the calcination temperature and the calcination time must be within the ranges of from 900° to 1,100° C. and from 5 to 20 hours, respectively. If the respective conditions are less than the lower limits, it is likely that unreacted material will remain, and it is difficult to obtain a pollucite single phase product. On the other hand, if the respective conditions exceed the upper limits, the amount of volatilization of the cesium content, etc. tends to be large, and the composition of the powder tends to be outside the range specified in ① or ②. However, even if the powder obtained under the conditions of ③ (for example, even when the calcination temperature is less then 1,000° C.) is once cooled and then heated to 1,000° C., the thermal expansion coefficient is maintained to be low, and no change is observed in the composition.

When the calcination is conducted in two steps as in ⑤, it becomes easy to control the volatilization of the cesium content, etc. and to obtain a powder product having a better low thermal expansion property. The purpose of the first step calcination is to let the chemical bonding of the respective components take place adequately without no substantial volatilization and to convert them to a substance hardly volatile even at a higher calcination temperature of the second step. The calcination temperature and the calcination time for this first step must be from 600° to 800° C. and from 24 to 200 hours, respectively. If the respective conditions are less than the lower limits, the chemical bonding of the respective components does not proceed adequately and consequently the amount of volatilization in the second step calcination tends to be large. On the other hand, if the respective conditions exceed the upper limits, the amount of volatilization in the first step tends to be large, whereby the composition of the powder obtainable in the second calcination tends to be outside the range specified in ① or ②. By the treatment of this first step, the total amount of volatilization in the first and second steps can be made small, and it is thereby possible to obtain a powder product exhibiting a low thermal expansion property up to a higher temperature. The calcination temperature and the calcination time in the second step must be from 900° to 1,100° C. and from 20 to 100 hours, respectively. If the calcination temperature is less than 900° C., it tends to be difficult to obtain a pollucite single phase product. On the other hand, if the calcination temperature exceeds 1,100° C. or if the calcination time exceeds 100 hours, the amount of volatilization tends to be substantial. If the calcination is less than 20 hours, the obtained powder product tends to have an inadequate low thermal expansion property at a temperature exceeding 1,000° C. However, even when the powder obtained under the conditions of ④ is once cooled and then heated to 1,300° C., the thermal expansion coefficient is maintained to be low, and no change is observed in the composition.

The mechanism under which the effects of the present invention are obtainable, is not yet adequately understood. However, it is considered that the pollucite of ① is the one crystallized within a range where cesium is slightly lower than the composition of the conventional pollucite, whereby a substantial degree of freeness exists in the ring structure composed of alumina and silica, and the thermal energy can be consumed without changing the inter-atomic distance in the crystal structure even under heating, and thus there will be no apparent thermal expansion.

As described in the foregoing, the pollucite powders of the present invention have very low apparent thermal expansion coefficients within a range of from room temperature to a high temperature of at least 1,000° C. and thus they are expected to be useful as starting materials for materials which are required to have high heat resistance. Further, sintered products obtained from the pollucite powders of the present invention are dense and strong as compared with those obtained from pollucite powders having compositions outside the ranges specified by the present invention. The methods of the present invention are relatively simple and yet are capable of obtaining such excellent pollucite powders.

Now, the present invention will be described in further detail with reference to Examples. However, it should be understood that the present invention is by no means restricted to such specific Examples.

EXAMPLES 1 to 5 and COMPARATIVE EXAMPLES 1 to 8

Alumina sol (concentration: 20 wt %, manufactured by Nissan Chemical Industries, Ltd.) and silica sol (concentration: 20 wt %, manufactured by Nissan Chemical Industries, Ltd.) were mixed, and the pH was adjusted to 5.5 with ammonia. The mixture was stirred for 24 hours and then dehydrated. The obtained mixture powder was then mixed with cesium nitrate (guaranteed reagent, manufactured by Wako Junyaku Kogyo K.K.), or with the cesium nitrate and lithium nitrate (guaranteed reagent, manufactured by Wako Junyaku Kogyo K.K.) in ethanol by a ball mill for 24 hr, and the mixture was dried. The obtained powder was calcined in one step or in two steps to obtain a pollucite powder.

The composition of the powder was analyzed, i.e. $Cs_2O$ and $Li_2O$ were analyzed by an atomic absorption spectroscopy; $Al_2O_3$ was analyzed by an EDTA titration method; and $SiO_2$ was analyzed by a silicon dioxide gravimetric analysis. Further, the X-ray diffraction pattern of the powder was measured at room temperature by a powder X-ray diffraction analyzer (manufactured by Rigaku Denki K.K.) by means of a copper tubular bulb with a wavelength of 1.5418 Å. As a result, the powder obtained in each Example was found to have a cubic single phase of pollucite crystal structure. Further, the lattice constant within a range of from room temperature to 1,000° C. or to 1,300° C., was obtained by measuring the angles of peaks of (332), (431), (440), (611), (444) and (721) mirror indicies and calculating the lattice constant by a silicon external standard method using such measured values. The measuring conditions were such that the scanning speed was 1°/min, and the step sampling was 0.02.

Each powder was molded and sintered under atmospheric pressure at 1,500° C. for 6 hours, and the density of the obtained sintered body was measured by an Archimedes method, and the three-point flexural strength was measured by JIS R 1601.

Figure 2:
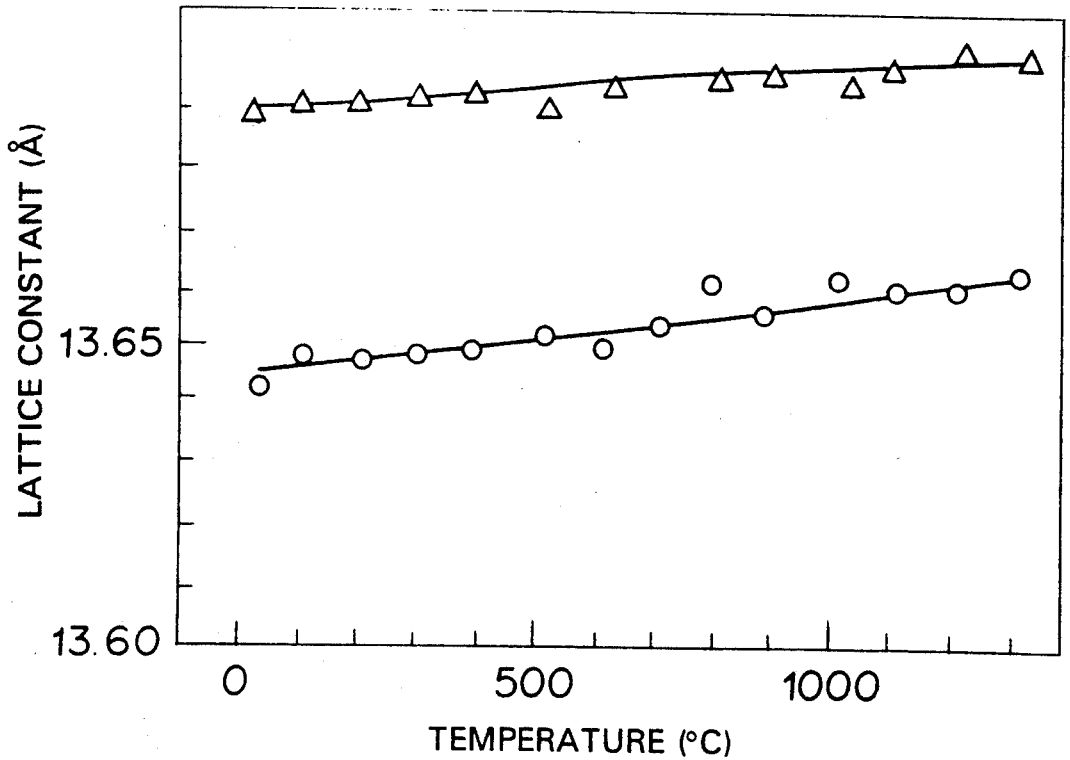
FIG. 2 is a graph showing the relation between the lattice constant of pollucite and the temperature, with respect to the pollucite obtained in Example 3 (shown by ○) and the one obtained in Example 5 (shown by △).
Figure 3:
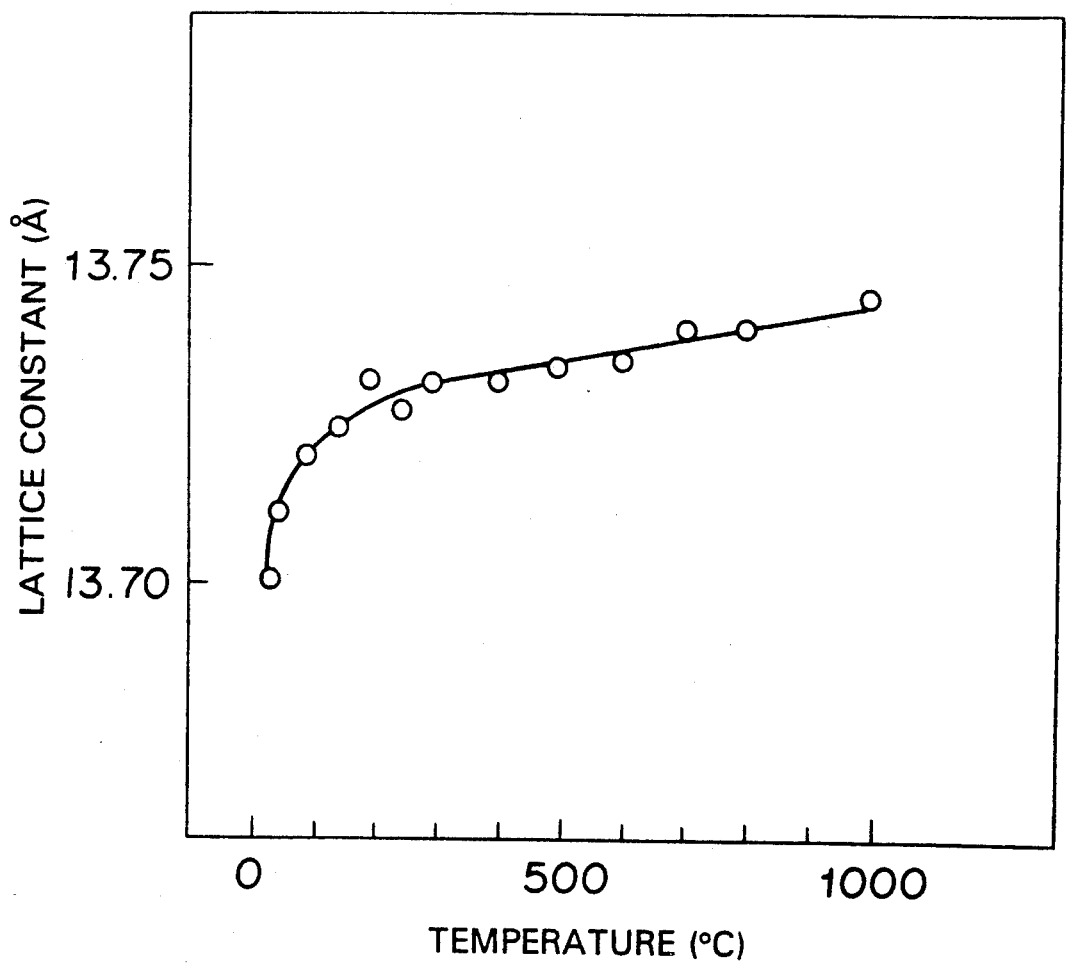
FIG. 3 is a graph showing the relation between the lattice constant of conventional pollucite and the temperature, with respect to the conventional pollucite obtained in Comparative Example 1.
Figure 4:
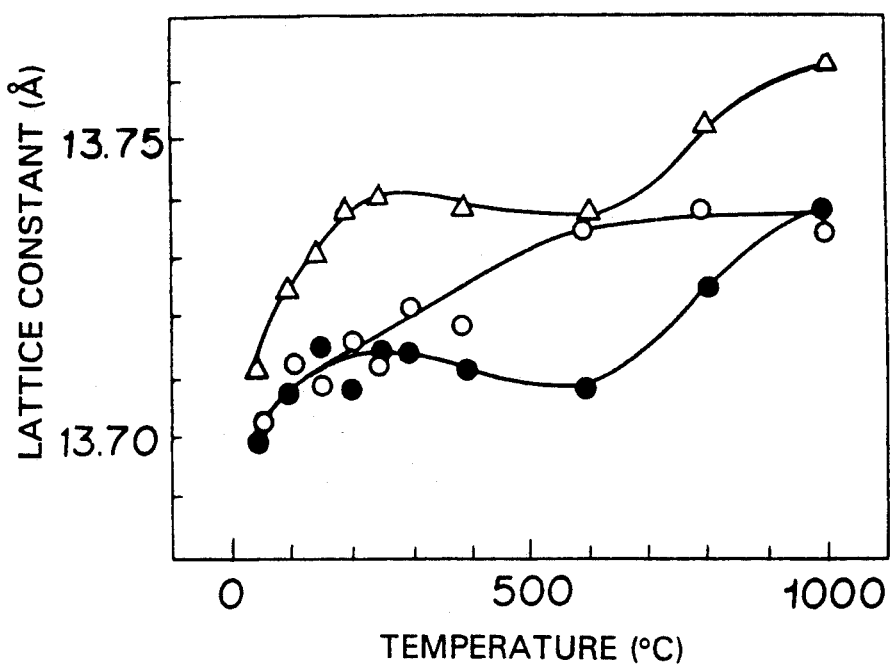
FIG. 4 is a graph showing the relation between the lattice constant of pollucite and the temperature, with respect to the pollucite obtained in Comparative Example 2 (shown by ○), the one obtained in Comparative Example 3 (shown by ●) and the one obtained in Comparative Example 4 (shown by △).
Figure 5:
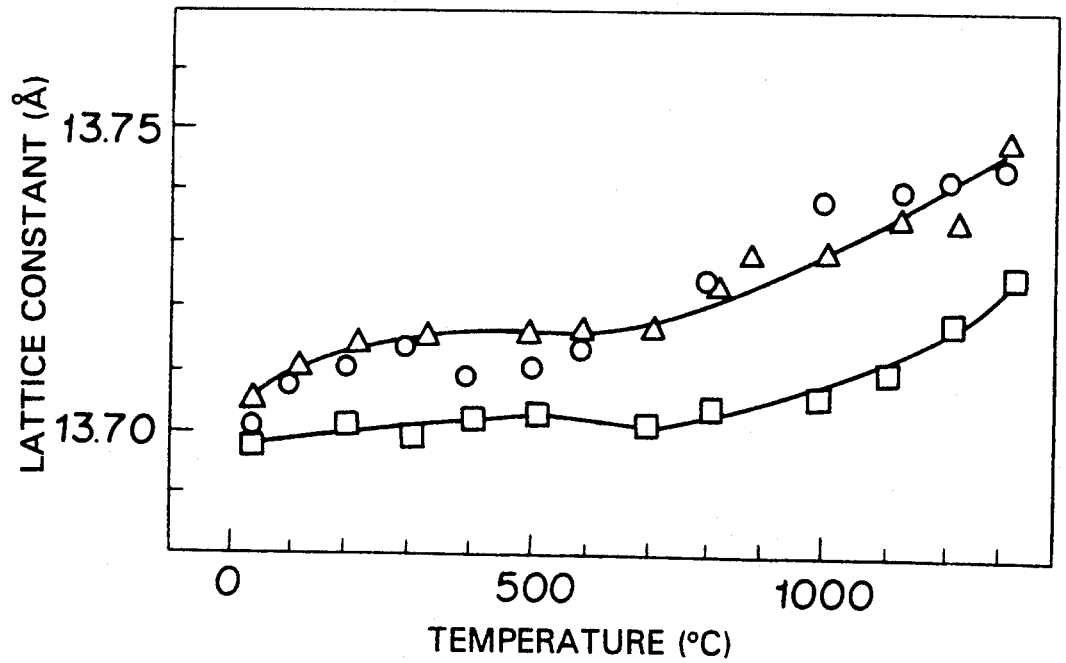
FIG. 5, is a graph showing the relation between the lattice constant of pollucite and the temperature, with respect to the pollucite obtained in Comparative Example 5 (shown by ◯), the one obtained in Comparative Example 6 (shown by △) and the one obtained in Comparative Example 8 (shown by ☐).

The conditions for preparation of the respective pollucite powders not disclosed above are shown in Table 1, and the compositions of the pollucite powders and the bulk densities and the three-point flexural strengths (average values obtained from 10 test specimens) of the respective sintered bodies are shown in Table 2. The X-ray diffraction patterns of the pollucite powders obtained in Examples 1 and 3 are shown in Tables 3 and 4, respectively. The powders obtained in any other Examples and Comparative Examples showed substantially the same X-ray diffraction patterns as those of Tables 3 and 4. The temperature dependencies of the lattice constants of the pollucite powders obtained in Examples 1 to 3 and 5 and Comparative Examples 1 to 6 and 8 are shown in FIGS. 1 to 5, respectively. The temperature dependency of the lattice constant of the product obtained in Example 4 was the same as the one obtained in Example 3, and the lattice constant of the product obtained in Comparative Example 7 was substantially the same as the one obtained in Comparative Example 5.

TABLE 1

| | Conditions for preparing pollucite powders | | | | | | |
|---|---|---|---|---|---|---|---|
| | Composition of starting material | | | Conditions for calcination | | | |
| | | | | 1st step | | 2nd step | |
| | $Al_2O_3/SiO_2$ molar ratio | $Cs_2O/SiO_2$ molar ratio | $Li_2O/SiO_2$ molar ratio | Time hr | Temp. °C. | Time hr | Temp. °C. |
| Examples | | | | | | | |
| 1 | 0.240 | 0.21 | | 10 | 1,000 | | |
| 2 | 0.213 | 0.196 | | 10 | 1,000 | | |
| 3 | 0.222 | 0.204 | 0.018 | 10 | 1,000 | | |
| 4 | 0.233 | 0.201 | | 20 | 950 | | |
| 5 | 0.244 | 0.21 | | 50 | 750 | 10 | 1,000 |
| Comparative Examples | | | | | | | |
| 1 | 0.250 | 0.250 | | 96 | 1,200 | | |

TABLE 1-continued

Conditions for preparing pollucite powders

| | Composition of starting material | | | Conditions for calcination | | | |
|---|---|---|---|---|---|---|---|
| | | | | 1st step | | 2nd step | |
| | $Al_2O_3/SiO_2$ molar ratio | $Cs_2O/SiO_2$ molar ratio | $Li_2O/SiO_2$ molar ratio | Time hr | Temp. °C. | Time hr | Temp. °C. |
| 2 | 0.24 | 0.228 | | 10 | 1,000 | | |
| 3 | 0.3 | 0.218 | | 10 | 1,000 | | |
| 4 | 0.317 | 0.254 | | 10 | 1,000 | | |
| 5 | 0.213 | 0.196 | | 50 | 650 | 25 | 1,000 |
| 6 | 0.213 | 0.196 | | 50 | 850 | 25 | 1,000 |
| 7 | 0.213 | 0.196 | | 10 | 750 | 25 | 1,000 |
| 8 | 0.222 | 0.22 | 0.01 | 10 | 1,000 | | |

TABLE 2

Composition of pollucite powders, and bulk densities and three-point flexural strength of sintered bodies

| | Pollucite powder product | | | Sintered body | |
|---|---|---|---|---|---|
| | $Al_2O_3/SiO_2$ molar ratio | $Cs_2O/SiO_2$ molar ratio | $Li_2O/SiO_2$ molar ratio | Bulk density g/cm³ | Three-point flexural strength Kg/mm² |
| Examples | | | | | |
| 1 | 0.240 | 0.204 | | 2.94 | 15 |
| 2 | 0.211 | 0.194 | | 3.01 | 14 |
| 3 | 0.220 | 0.201 | 0.017 | 2.93 | 16 |
| 4 | 0.230 | 0.199 | | 2.94 | 14 |
| 5 | 0.243 | 0.209 | | 2.92 | 15 |
| Comparative Examples | | | | | |
| 1 | 0.240 | 0.227 | | 2.45 | 5 |
| 2 | 0.239 | 0.266 | | 2.77 | 8 |
| 3 | 0.298 | 0.216 | | 2.76 | 10 |
| 4 | 0.315 | 0.250 | | 2.61 | 5 |
| 5 | 0.203 | 0.176 | | 2.76 | 7 |
| 6 | 0.201 | 0.171 | | 2.81 | 7 |
| 7 | 0.200 | 0.168 | | 2.65 | 6 |
| 8 | 0.221 | 0.219 | 0.01 | 2.78 | 7 |

TABLE 3

X-ray diffraction pattern of pollucite powder obtained in Example 1

| d value (Å) | Relative intensity | hkl |
|---|---|---|
| 3.659 | 44 | 321 |
| 3.423 | 100 | 400 |
| 2.919 | 41 | 332 |
| 2.685 | 5 | 431 |
| 2.420 | 24 | 440 |
| 2.221 | 13 | 611 |
| 1.976 | 4 | 444 |
| 1.863 | 12 | 721 |

TABLE 4

X-ray diffraction pattern of pollucite powder obtained in Example 3

| d value (Å) | Relative intensity | hkl |
|---|---|---|
| 3.646 | 45 | 321 |
| 3.411 | 100 | 400 |
| 2.909 | 41 | 332 |
| 2.676 | 5 | 431 |
| 2.412 | 24 | 440 |
| 2.213 | 13 | 611 |
| 1.969 | 4 | 444 |
| 1.857 | 12 | 721 |

We claim:

1. A pollucite powder consisting essentially of a pollucite crystal structure and having an $Al_2O_3/SiO_2$ molar ratio of from 0.21 to 0.25, a $(Cs_2O+Li_2O)/SiO_2$ molar ratio of from 0.19 to 0.22 and a $Li_2O/Cs_2O$ molar ratio of from 2/98 to 10/90.

* * * * *